Nov. 5, 1929.  A. O. MILLER  1,734,591
BEARING
Filed June 29, 1925
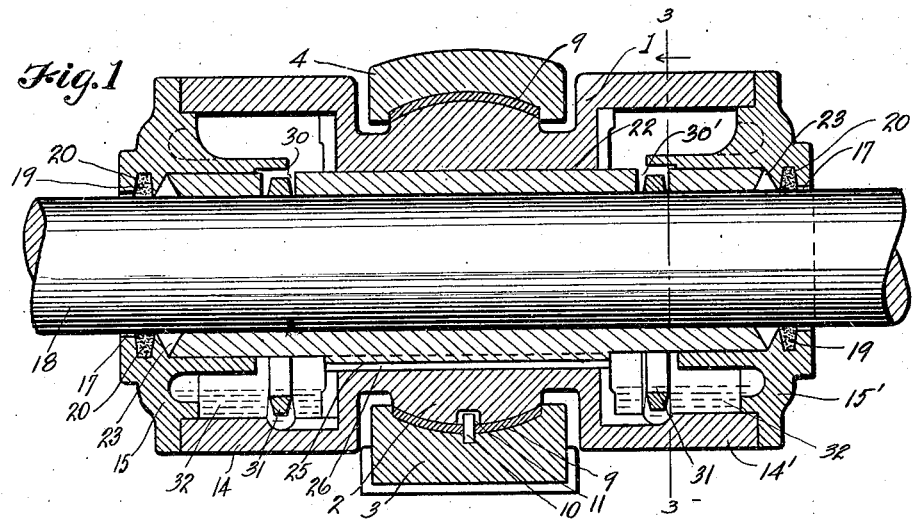
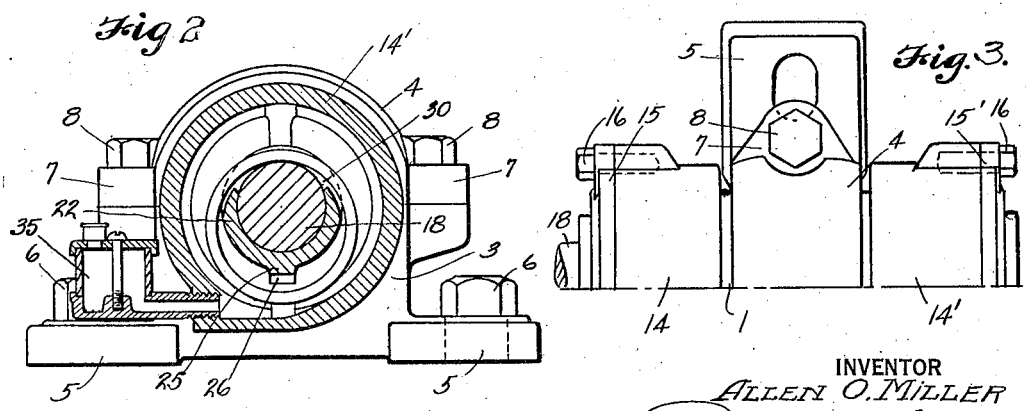
INVENTOR
ALLEN O. MILLER
BY
Richard J. Cook
ATTORNEY Patented Nov. 5, 1929

1,734,591

UNITED STATES PATENT OFFICE

ALLEN O. MILLER, OF SEATTLE, WASHINGTON

BEARING

Application filed June 29, 1925. Serial No. 40,156.

This invention relates to improvements in shaft bearings, and has for its principal object to provide a bearing equipped with a ball and socket mounting and designed for the interchangeable use therein of ball bearings or of a lining sleeve for the support of the shaft.

Another object resides in the details of construction whereby the bearing may be properly lubricated when using the liner or ball bearings.

Another object resides in the provision of interchangeable end pieces for sustaining the balls or sleeves in position.

In accomplishing these and other objects of the invention, I have provided the improved details of construction, the preferred forms of which are illustrated in the accompanying drawings, wherein—

Figure 1 is a central, longitudinal sectional view of a bearing embodied by the present invention showing it equipped with a liner.

Figure 2 is a transverse sectional view through the bearing, taken substantially on the line 3—3 in Figure 1.

Figure 3 is a plan view of one-half of the bearing.

Referring more in detail to the drawings—

1 designates a shaft housing which is substantially of cylindrical form and is provided about its central portion with a spherically formed seat 2 adapted to be pivotally fitted within a spherically socketed mounting block comprising a base portion 3 and a removable cover 4; the base being provided with laterally extending flanges 5 for receiving anchor bolts 6 and the cover being flanged, as at 7, to receive bolts 8 for securing it removably to the base to retain the housing 1 functionally in place. A Babbitt metal bushing 9 is located within the mounting between the spherical seat of the housing and spherical socket of the block for the purpose of taking the wear that is incidental to relative movement of these parts and this is held against rotative movement by means of a stud 10 that extends through the bushing and into a socket 11 in the seat 2.

The ends of the housing 1 are enlarged to provide the cylindrical bell portions 14 and 14′ within which end caps or plates 15—15′ are fitted and secured by bolts 16. The end caps are provided with openings 17 co-axially alined with the housing 1 through which the shaft 18, for which the bearing is designed, is rotatably extended and felt washers 19 are fitted within grooves 20 in these openings 17 to prevent leakage of oil about the shaft.

In Figure 1, I have shown the bearing equipped with a liner, or sleeve, 22, of Babbitt metal or other suitable material in which the shaft rotates. This sleeve is removably fitted within the central portion of the housing 1 and extends at its ends within annular recesses 23 formed in the end cover plates 15—15′ and it is provided along its under edge with a longitudinally directed rib 25 that seats within a groove 26 formed in the housing 1 and which serves as a connecting channel for the passage of oil from one end bell into the other.

Cut through the upper sides and within the end portions of the liner are slots 30—30′ and suspended on the shaft within these slots are oiling rings 31 which depend within the oil, designated at 32, within the end bells and which operate, as the shaft revolves, to deliver oil into the slots and thence into the liner. An oil cup 35 is mounted to deliver oil into the bell at one end of the housing and from this bell it flows through slot 26 into the other end bell.

When it is desired to use ball bearings in lieu of the liner, the parts are assembled, as shown in Figure 2, wherein 36 and 37 designates inner and outer ball races wherein balls 38 are contained; the outer races are fitted within the end bells of the housing and the inner races are mounted on carrier sleeves 39 that are fitted about the shaft. Set screws 40 extend through the sleeves 39 into the shaft to prevent rotative movement of one relative to the other. When ball bearings are used in the bearing, the end caps 15—15′ are replaced by caps 41—41′.

I claim:

In a bearing of the character described, a journal housing of cylindrical form adapted to receive a shaft coaxially therein, a lining sleeve fitted within the housing about the shaft and caps fitted into and secured to the ends of the housing to retain the sleeve in place, said caps having annular recesses in their inner faces about the shaft into which the ends of said sleeve are projected.

Signed at Seattle, King County, Washington, this 16th day of April, 1925.

ALLEN O. MILLER.